United States Patent
Rangappa et al.

(10) Patent No.: US 9,635,089 B2
(45) Date of Patent: Apr. 25, 2017

(54) AUTO SUGGESTION IN SEARCH WITH ADDITIONAL PROPERTIES

(71) Applicant: Verizon Patent and Licensing Inc., Arlington, VA (US)

(72) Inventors: Annappa D. Rangappa, Piscataway, NJ (US); Sukumar Thiagarajah, Laurence Harbor, NJ (US); Vijayachandran Jayachandran, Dallas, TX (US); Pankaj C. Rajankar, Cumming, GA (US); Krishnendu Karmohan, Scotch Plains, NJ (US); Richard Ching, Johns Creek, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 270 days.

(21) Appl. No.: 14/587,155

(22) Filed: Dec. 31, 2014

(65) Prior Publication Data

US 2016/0188620 A1 Jun. 30, 2016

(51) Int. Cl.
G06F 17/30 (2006.01)
H04L 29/08 (2006.01)

(52) U.S. Cl.
CPC .......... H04L 67/02 (2013.01); G06F 17/3064 (2013.01); H04L 67/125 (2013.01)

(58) Field of Classification Search
CPC .......... G06F 17/3028; G06F 17/30864; G06F 17/30905; G06F 17/2247; G06F 17/227; G06F 17/30911; G06F 17/3064
USPC .......... 707/E17.031, 803, 999.102
See application file for complete search history.

(56) References Cited

U.S. PATENT DOCUMENTS

| | | | |
|---|---|---|---|
| 7,546,313 B1* | 6/2009 | Sonderegger | H04L 41/0266 |
| 2012/0198222 A1* | 8/2012 | Tukol | G06F 9/44505 |
| | | | 713/2 |
| 2015/0100879 A1* | 4/2015 | Nandagopal | G06F 9/44521 |
| | | | 715/235 |

\* cited by examiner

Primary Examiner — Debbie Le

(57) ABSTRACT

A computer initializes a configuration specified in an extensible markup language (XML) configuration file. The XML configuration file specifies at least one data source, a dimension to map each item of a plurality of items that include products, product accessories, or product support documents in the at least one data source, and a display priority for each item. Next, the computer reads data from the at least one data source specified in the configuration file. The computer generates an XML dimension hierarchy file for the read data using the configuration file. The XML dimension hierarchy file includes a dimension node for each item. Each dimension node has at least one property attached to each item and at least one synonym that is searchable to index each item. Finally, the computer preprocesses the XML dimension hierarchy file to index the at least one data source.

20 Claims, 9 Drawing Sheets

```
<DIMENSION_NODE>
    <DVAL TYPE="EXACT">
        <DVAL_ID ID="1100000011"/>
        <SYN SEARCH="TRUE" DISPLAY="TRUE" CLASSIFY="TRUE"><![CDATA[08958194 Galaxy S 5 dev2080010]]></SYN>
```

```
<SYN SEARCH="TRUE" DISPLAY="FALSE" CLASSIFY="TRUE"><![CDATA[08958194 Samsung]]></SYN>
<SYN SEARCH="TRUE" DISPLAY="FALSE" CLASSIFY="FALSE"><![CDATA[08958194 GnG Devices]]></SYN>
<SYN SEARCH="TRUE" DISPLAY="FALSE" CLASSIFY="FALSE"><![CDATA[08958194 Smartphones]]></SYN>
```

```
<SYN SEARCH="FALSE" DISPLAY="FALSE" CLASSIFY="TRUE"><![CDATA[essential-travel-bundle-for-lucid-3-purple]]></SYN>
    <PROP NAME="sku.displayName">
        <PVAL><![CDATA[Essential Travel Bundle for Lucid 3 - Purple]]></PVAL>
    </PROP>
    <PROP NAME="sku.imageName">
        <PVAL><![CDATA[http://s7.vzw.com/is/image/VerizonWireless/lg-lucid-3-protect-case-prp-essential-gg-0004-bundle-hs]]></PVAL>
    </PROP>
    <PROP NAME="product.repositoryId">
        <PVAL><![CDATA[2600005]]></PVAL>
    </PROP>
    <PROP NAME="sku.seoDisplayName">
        <PVAL><![CDATA[http://testman.verizonwireless.com/accessories/essential-travel-bundle-for-lucid-3-purple]]></PVAL>
    </PROP>
    <PROP NAME="content.type">
        <PVAL><![CDATA[product-bundle]]></PVAL>
    </PROP>
    <PROP NAME="Price">
        <PVAL><![CDATA[49.99]]></PVAL>
    </PROP>
    <PROP NAME="DateAvailable">
        <PVAL><![CDATA[1397828173755]]></PVAL>
    </PROP>
```

AUTO SUGGESTION IN SEARCH WITH ADDITIONAL PROPERTIES

BACKGROUND

Software tools available today can provide guided search based on keywords entered. For example, Oracle Endeca® is a commercially available software product that includes a keyword search functionality with an autosuggest feature. When a customer begins typing in a text field, the autosuggest feature suggests search terms that appear as text in a drop-down menu. When the user clicks on one of the terms in the drop-down menu, the term is entered into the search field and the search is executed.

Unfortunately, such software tools have shortcomings. For example, detailed information beyond the suggested text keywords is not displayed. In addition, while the suggested keywords execute a search, the suggested keywords do not direct a user to a detail page of a particular item.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 5A-C are examples of portions of an XML dimension hierarchy file that is generated by the search server of FIG. 1.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and discussed below.

Figure 1:
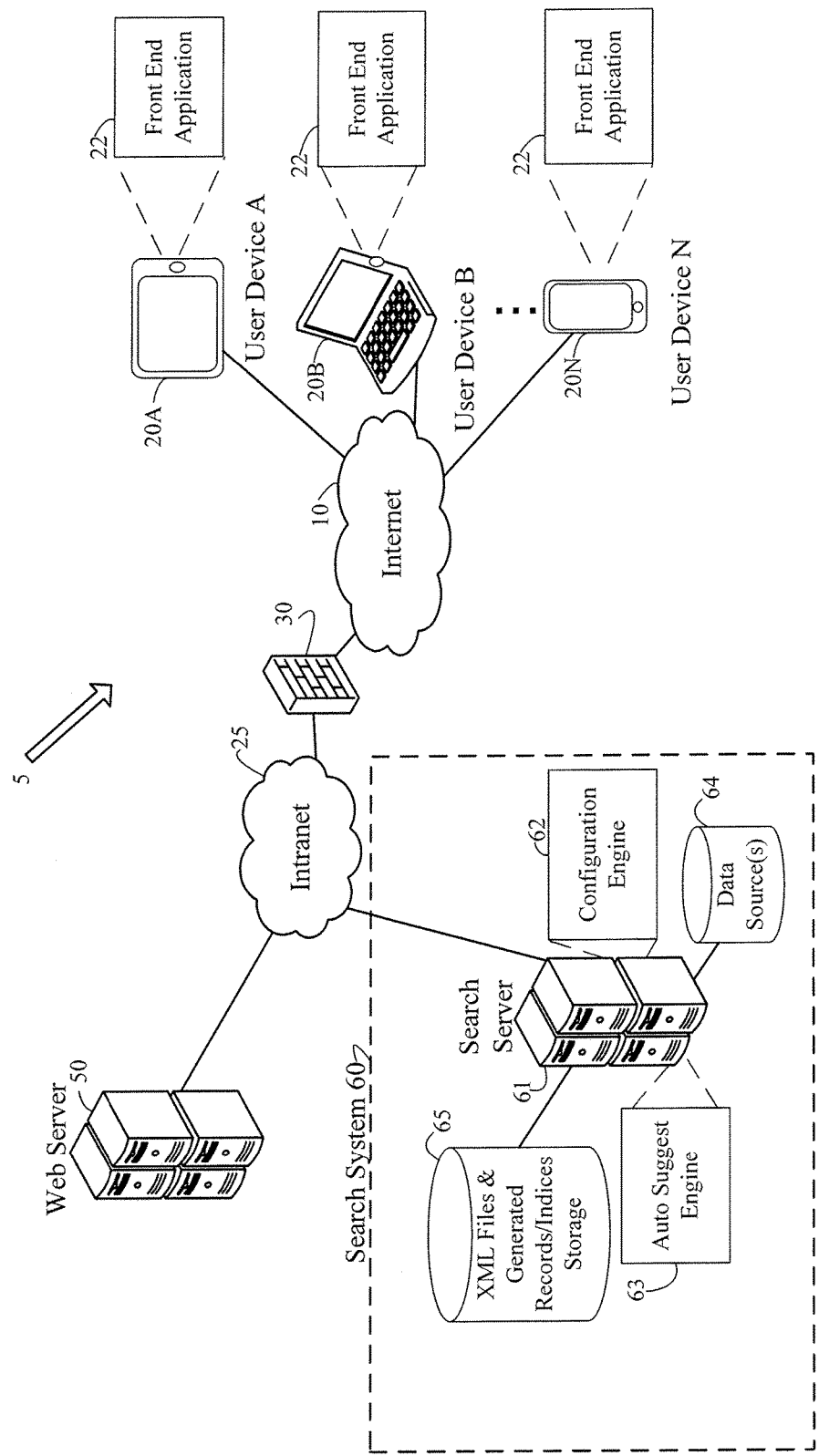
FIG. 1 is a high-level functional block diagram of an example of a system of networks and devices that provide a variety of communication services, including communications in support of automatic suggestion in search with additional properties.

FIG. 1 illustrates a functional block diagram of a system 5 that provides communications in support of automatic suggestion in search with additional properties. The illustrated system 5 includes an Internet communication network 10, in this case, operated in accordance with public packet-switched data transport and Internet Protocol (IP). In another example, the communication network 10 may include a 4G LTE mobile network that provides mobile telephone communications as well as Internet access services. In the mobile environment, communication network 10 may connect to public packet-switched data communication networks such as the Internet via a packet gateway (PGW) (not shown).

The data communications via the Internet communication network 10 and network connected equipment provided for users that utilize respective user devices 20A-N and the other shown server/systems 50, 60 support a variety of services. For example, information technology management personnel that manage an e-commerce website and users searching the website, typically engage in communications pertaining to web browsing and, as such, data communications in support of web browsing such as hypertext transfer protocol (I-ITTP) services and extensible markup language (XML) services are supported. Other services, such as e-mail, streaming or downloading content, text and multi-media messages, etc. may also be supported. In our discussion, the user devices 20A-N and other devices/system 50, 60 use packet communications via the Internet 10, Intranet 25, which would typically would utilize packet transport and Internet Protocol (IP), including for data, voice and related communications. The devices, here, however, can utilize other networks, other forms of network transport, and/or other protocols for the relevant communications.

As shown, system 5 includes one or more user devices 20A-N (representative of any number of user computing devices), each of which may include a front end application 22 that runs as an application in a web browser, for example. As explained below, the system 5 provides enhanced suggestions to not only display the text of automatically suggested search terms in the front end application 22, but also to display additional information with more metadata to view and click on (i.e., select) in the front end application 22.

User devices 20A-N are computing devices and can be personal computers (PCs), laptops, personal digital assistants (PDAs), smartphones, tablet computers, portable games or media players with wireless communication elements, or other portable devices designed to communicate via one or more wireless networks, including packet-switched transport networks. User devices 20A-N, however, are in communication with Internet 10 and have the capability to communicate via other wired or wireless media, such as a WiFi connection (now shown). User devices 20A-N and other devices/systems shown 50, 60, 61 have network communication capability and one or more physical elements for providing a user interface. Internally, such devices/systems may include a network interface device for data communication, such as an ethernet interface card or one or more wireless transceivers, a processor configured/connected to control device operation, a memory, and programming. As discussed more later, these devices/systems are programmed or otherwise configured to perform various functions involved in the configuration and display of automatically suggested search terms with additional properties.

For purposes of the present discussion, equipment communicating via the Intranet network 25 includes a web server 50 and a search system 60. The system administrator that operates the web server 50 and search system 60 utilizes a variety of other systems for related purposes, such as network maintenance and security. In the example, the system administrator has another data network, e.g. Intranet 25, that provides data communications for other data systems used; and that Intranet 25 has connectivity into the Internet 10 that provides communications services to the user devices 20A-N that. The Intranet 25 is connected to the Internet 10 via routing and protective gear generally represented by the firewall 30.

There may be one or more computer platforms to perform the functions of the web server 50 and the search server 61 of search system, which can provide redundancy and enable handling of a particular expected peak volume of searching transactions.

Web server 50 is a computer system that processes requests via hypertext transfer protocol (HTTP) that are issued from the front end applications 22 of the user devices 20A-N. In our example, the web server 50 hosts an e-commerce website, and accepts and supervises the HTTP requests. Typically, web server 50 stores, processes, and delivers web pages to the front end applications 22 of the user device 20A-N clients via HTTP. Such pages, can include HTML documents with images, style sheets, scripts, etc., that include both static and dynamically generated content.

Typically, the front end application 22 initiates communications by making a HTTP request that is triggered by entry of a text string by a user in an HTML textbox to execute a search, without pressing a carriage return or a submit button in an HTML form. In response to receiving the HTTP request, the web server 50 queries the search system 60 for automatically suggested search terms and suggested search items/results. To achieve this, the auto suggest engine 63 queries a generated XML dimension hierarchy file using an index for suggested search items having at least one synonym that matches the inputted text string or includes the text string as a subpart.

The web server 50 responds to the HTTP request from the front end application 22 with content that includes both the automatically suggested search terms and the suggested search items/results that are linked to the automatically suggested search terms. For example, the suggested search items/results include products, product accessories, and product support documents, and other items that are linked to the automatically suggested search terms. In connection with these linked items, additional properties of the items are provided by the web server 50, such as an image, display name, price, available date, release date, or rating with review count. Providing such details motivates users to select the items and a better user experience by displaying the items and item properties that are most likely to be of interest to the user early in the browsing/searching process. Consequently, the web server 50 generates and transmits a web page having the suggested search items and respective additional properties of each suggested search item to the front end application 22 of user device 20A-N. Hence, the initial HTTP request is fulfilled. This web page is then rendered/displayed via the front end application 22 of user device 20A-N.

As shown, the search system 60 includes a search server 61, data source(s) 64, and extensible markup language (XML) files & generated records/indices storage 65. Both data source(s) and XML files & generated records/indices storage 65 may include an object-relational database management system (DBMS) for storing one or more database records. Other suitable types of DBMS or storage protocols may be used as data source(s) 64 and XML files & generated records/indices storage 65, including a flat file, comma separated value (CSV) file, XML file, etc. Data source(s) 64 may include information from file systems, content management systems, databases, web servers, and other custom or raw data. Although shown as residing on the search server 64, it should be understood that both data source(s) 64 and XML files & generated records/indices storage 65 may reside in separate computer systems and/or located off-site. In such a configuration, search sever 61 accesses data source(s) 64 and XML files & generated records/indices storage 65 via the Intranet 25 and/or Internet 10, instead of a computer bus, for example.

In an example, the auto suggest engine 63 crawls data source(s) 64, converts documents and files into standard tagged records based on a configuration file, and stores the tagged records (i.e., read data) within a database in generated records storage 65. More specifically, auto suggest engine 63 executes a data processing routine that transforms the information in data source(s) into standardized tagged records, and then stores/loads those records in the generated records storage 65. Each record may be an entity in the data set that is to be navigated or searched for during the auto suggestion search to display as suggested search items/results. Unlike data source(s) 64, records may be standardized for consistency and classified as a separate dimension with one or more dimension values, properties, and synonyms, as explained in further detail below.

Search server 61 is a computer and includes a configuration engine 62 and auto suggest engine 63. The configuration engine 62 initializes the configuration that has settings, such as an XML configuration file, for example. The configuration specifies at least one data source, one or more dimensions to map each item of a plurality of items that include products, product accessories, or product support documents in the at least one data source, and a display priority for each item. The products, product accessories, or product support documents may be organized into one or more dimension groups. The display priority may be based on a boost, bury, or suppress (i.e., exclude) rating. The boost rating adjusts the display priority of the item upwards. The bury rating adjusts the display priority of the item downwards. The suppress rating indicates to suppress or not display the item. In other words, the suppress rating excludes an item by removing the particular item from the index and placing the particular item on an exclude list. Boost and bury items always remain present in the index. In contrast, suppressed items are removed from the index and are never available to the user.

For example, enterprise management personnel can configure the boost, bury, or suppress ratings through configuration engine 62 to promote, de-promote, or suppress certain items from the results according to business requirements or preferences in order to control the items that are displayed in the suggested search results. In addition, ratings of individual items can be modified automatically depending on user account characteristics or preferences, rather than having to be manually established by the personnel.

A dimension is an XML object/collection of related dimension values (DimVal objects), organized into a tree. A dimension value is the lowest-level building block that composes dimensions and classifications of records. The top-most dimension value in a dimension tree is known as the dimension root. Each dimension can belong to a single dimension group (DimGroup object). A dimension group imposes relationships on dimension objects. By creating a dimension group, dimensions can be organized for presentation purposes. If a dimension is not assigned to an explicit dimension group, the dimension is placed in an implicit dimension group of its own.

Configuration engine 62 may specify the configuration at several levels. For example configuration engine 62 specifies in the configuration file a first level of configuration that is common across all of the product, product accessory, and product support document categories. In addition, configuration engine 62 can specify a second level of configuration that is specific to the products, a third level of configuration that is specific to the product accessories, and a fourth level of configuration that is specific to the product support documents.

Auto suggest engine 63 reads data from the at least one data source specified in the configuration file, and then generates a dimension hierarchy file for the read data using the configuration file. The dimension hierarchy file includes a dimension node for each item in the data source(s) 64. Each dimension node has at least one property attached to each item and at least one synonym that is searchable to index each item. Subsequently, auto suggest engine 63 pre-processes the XML dimension hierarchy file to index the at least one data source. For example, auto suggest engine 63 generates an Endeca dimension.xml file, such that for each category, there is a predefined range of identifiers for each dimension used and a one-to-one dimension mapping is provided for each product, accessory, or product support document.

When generating the XML dimension hierarchy file, auto suggest engine 63 may output (e.g., write to the dimension.xml file) a separate dimension node for each item and link the separate dimension node to a detail page for the respective item. Each separate dimension node may have a unique identifier to distinguish the item and a group identifier to group related items. The group identifier may be embedded within a dimension value (DVAL) XML tag and the unique identifier may be embedded within a synonym XML tag. The auto suggest engine 63 may repeatedly (i.e., iteratively) preprocess the dimension hierarchy file to index the at least one data source at or after a predetermined time period (e.g., every six hours).

Auto suggest engine 63 may also add additional properties as searchable and provides a feature to boost, bury, or exclude certain items specified in the configuration file by configuration engine 62. In one example, auto suggest engine 63 adjusts the ranking of the first item upwards relative to the second item when the first item has a more recent release date than the second item. The display priority is a configuration value that dictates which products, product accessories, and product support documents will be displayed at the top of the order, item list, or other presentation format provided by a graphical user interface when multiple items match the auto suggestion results. Typically, the display priority is generated by the configuration engine 62 (e.g., the boost, bury, or suppress rating) and controls the ranking value that is generated for a dimension by the auto suggest engine 63. Upon determining first and second items have no boost, bury, or suppress rating (and thus no configured display priority), auto suggest engine 63 adjusts the ranking of the dimension belonging to the first item upwards relative to the dimension belonging to the second item when the first item has a release date or an available date that is more proximate to the current date than the second item. The release date is a past date on which the item was released. The available date is a projected data in the future that the item will be released. However, for purposes of the ranking calculations described herein, the release date and the available date are handled in the same manner.

As will become apparent below, a one-to-one dimension mapping can be defined for each item (e.g., product, accessory, or document) to show relevant information (e.g., properties) of the item in the suggested search results and link to a detail page of the item. The properties displayed in the suggested search results can be attached as a property to the dimension of each item. Each property provides descriptive information about the retrieved record of the dimension. A property that has to be searchable may be defined as a synonym with a SEARCH attribute as TRUE. Predetermined sorting of items in the suggested search results using any property, for example based on the release date, can be achieved by prefixing an integer ranking that is calculated using the property value to the dimension name of the item.

Figure 2:
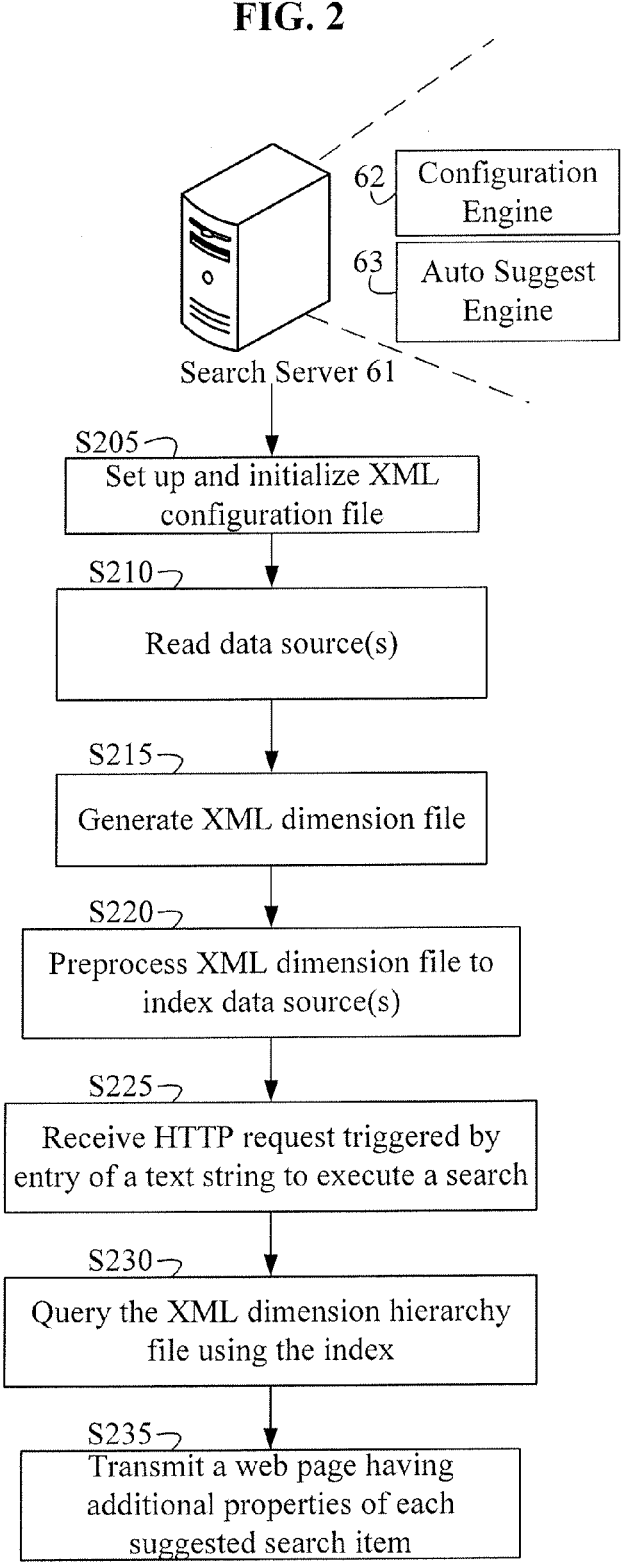
FIG. 2 is a flow chart of a procedure executed on a search server of a search system and other components of the system of FIG. 1.

FIG. 2 illustrates a procedural flow executed on the search server 61 of search system 60 and other components of the system 5 of FIG. 1. In the illustrated example, servers 50, 61 and devices 20A-N are in communication with the Internet 10, and the configuration engine 62 and auto suggest engine 63 execute the illustrated subroutines. Although shown as occurring serially, the blocks of FIG. 2 may be reordered or parallelized depending on the implementation, as discussed below.

Beginning in step S205, the configuration engine 62 of search server 61, sets up and initializes an XML configuration file. In the example, front end application 22 of user devices 20A-N is used to specify a configuration via a graphical user interface front end by enterprise management or information technology personnel. This configuration is then stored an extensible markup language (XML) configuration file. The XML configuration file specifies at least one data source; a dimension to map each item of a plurality of items that include products, product accessories, or product support documents in the at least one data source; and a display priority for each item. A boost, bury, or suppress rating may be indicated or inputted via the front end application 22 to adjust the display priority for each item. The boost rating adjusts the display priority of the item upwards. The bury rating adjusts the display priority of the item downwards. The suppress rating indicates to suppress or not display the item.

In addition, the front end application 22 may be used to specify in the XML configuration file a first level of configuration that is common across all of the plurality of products, product accessories, and product support documents. Subsequently, category specific configurations may be specified, such as a second level of configuration that is specific to the products, a third level of configuration that is specific to the product accessories, and a fourth level of configuration that is specific to the product support documents.

Continuing now to step S210, the auto suggest engine 62 reads one or more data sources 64 specified in the configuration file. For example, the auto suggest engine 63 connects to an Endeca Content Acquisition System (CAS) or any data sources, such as XML or comma separated value files, databases, or any other data repositories to retrieve information (e.g., raw data) based on the specified configuration for each category in the configuration file. The auto suggest engine 62 may crawl a file system, content management system, web server, database, or customized data sources for documents, files, or raw data to find of one or more items. After crawling the data source(s) 64, auto suggest engine 63 may convert each item in the documents, files, or raw data into tagged records based on the configuration file, and then stores the record of each item in the generated records storage 65.

Proceeding now to step S215, the auto suggest engine 63 generates an XML dimension hierarchy file for the read data using the configuration file. The dimension hierarchy file can include a separate dimension node for each item/record in the data source(s) 64 that are ingested during step S210. Each dimension node may have at least one property attached to each item and at least one synonym that is searchable to index each item. In our example, the auto suggest engine 63 outputs a separate dimension node for each item to the XML dimension hierarchy file. Multiple properties and synonyms are associated with the separate dimension node by embedding the properties and synonyms within the dimension object of the item. This enables all of the properties of each item/record to be mapped to the dimension and retrieved for display in the front end application 22. More specifically, the values of the different properties are attached to the dimension in order to ultimately display these properties in the front end application 22.

Each separate dimension node has a unique identifier to distinguish the item and a group identifier to group related items. The group identifier and unique identifier may be embedded within a dimension value (DVAL) or synonym (SYN) XML tags. Each separate dimension node is linked to a detail page for each item, such as uniform resource locator (URL). Additional properties that are outputted to the XML dimension hierarchy file for the dimension of each item can include an image, display name, price, release date, available date, or rating with review count of the item (e.g., product or product accessory). The auto suggest engine 63 may embed the image, the price, or the available date as a character data (CDATA) section within a property value (PVAL) XML tag of the dimension. When generating each dimension node for each item, the auto suggest engine 63 also outputs a first synonym corresponding to brand of the item (e.g., Samsung) and a second synonym corresponding to product category of the item (e.g., smartphone). This indexes the item using multiple criteria and enables the item to be retrieved during searches using both the brand and product category.

When generating the XML dimension hierarchy file, auto suggest engine 63 may prefix the display name of each dimension node with a ranking that is an integer to determine display order of the items. Typically, a low value integer receives a high ranking relative to a high value integer and the high value integer receives a low ranking relative to the low value integer. The ranking is prefixed as a character data (CDATA) XML section or synonym that is a machine readable number and is based on the display priority from the configuration file.

The auto suggest engine 63 may generate an XML dimension hierarchy file for each category (e.g., product, product accessory, products support document) based on the configuration file. Auto suggest engine 63 then generates a consolidated dimension hierarchy file for each category based on the configuration file. For example, auto suggest engine 63 generates a first XML dimension category file for the products, a second XML dimension category file for the product accessories, and a third XML dimension category file for the product support documents. Subsequently, the auto suggest engine 63 combines the first, second, and third XML dimension category files to generate the XML dimension hierarchy file by consolidating the first, second, and third category files together. After the consolidated XML dimension hierarchy file is generated from all of the individual dimension files, the consolidated XML dimension hierarchy file may be pushed to an indexing pipeline for indexing of the data sources.

In step S220, the auto suggest engine 63 preprocesses the XML dimension hierarchy file to index the data source(s) 64 by, for example, indexing the record for each item in the generated records storage 65 using one or more synonyms of each item. In our example, the Oracle Endeca indexing pipeline is handed the generated XML dimension hierarchy file for indexing. Each dimension is indexed based on one or more searchable synonyms of the particular dimension.

In step S225, web server 50 receives a hypertext text transfer protocol (HTTP) request triggered by entry of a text string by a user to execute a search in a front end application 22 of a user device 20A-N. Of note, this step is automatic and is triggered without pressing of a carriage return, a submit button in an HTML form, or a button or gesture via other suitable graphical user interfaces. Search server 61 subsequently receives the forwarded text string from the web server 50.

In step S230, search server 61 retrieves one or more dimension nodes for display from the preprocessed XML dimension hierarchy file. Search server 61 queries the XML dimension hierarchy file using the index for suggested search items having at least one synonym that matches the text string. In other words, each of the retrieved dimension nodes are the suggested search items and each possess a synonym that matches the received text string exactly or includes the text string as a subpart.

Subsequently, in step S235, the suggested search items are sent to the web server 50 from search server 61. To fulfill the initial HTTP request, web server 50 generates and transmits a web page having the additional properties of each suggested search item to the respective user device 20A-N. As a result, search server 61 controls the information displayed with each item and includes additional properties of interest (e.g., price, image, etc.) with the display item. In comparison to just providing a name and a URL of the item, displaying such additional properties provides immediate insight into the item to the user and short-circuits the searching process.

For example, incorporating and displaying the additional properties of interest avoids subsequent queries by the user for each of the displayed items, thereby reducing server access calls and network usage. More specifically, by providing these additional properties, the user is able to more immediately find and discern whether the item is of interest, and therefore cut down the item search space. Consequently, redundant and unnecessary processing requests from the user device 20A-N to the web server 50 and search server 61 are eliminated. This advantageously reduces the network load on the Internet 10 and Intranet 25, as well as the processing time and load on the web server 50 and search server 61.

Figure 3:
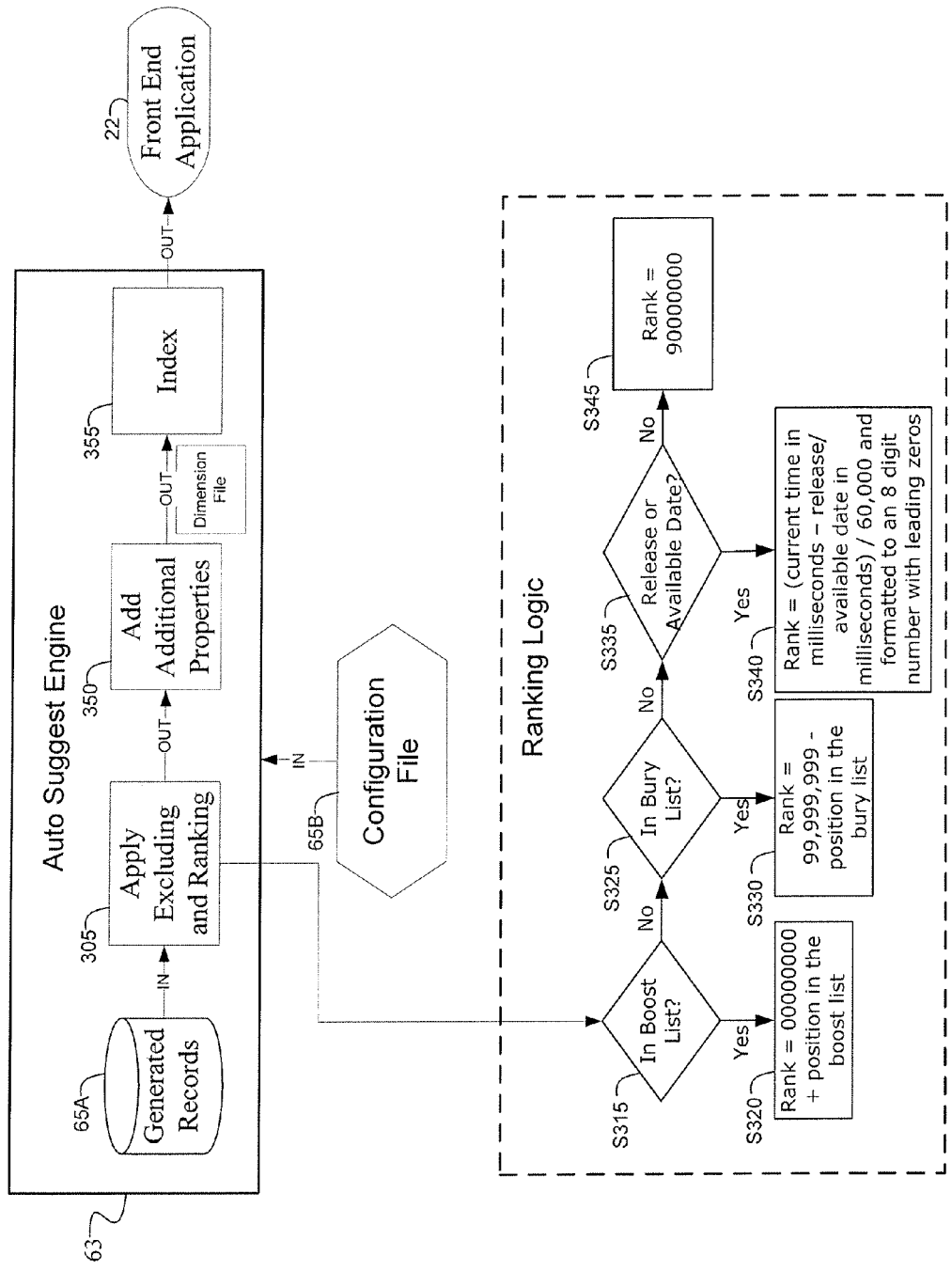
FIG. 3 is a high-level block diagram of the auto suggestion in search with additional properties process that is executed on the search server and other components of the system of FIG. 1

FIG. 3 illustrates a high-level block diagram of the auto suggestion in search with additional properties process that is executed on the search server 61 and other components of the system 5 of FIG. 1. In the example, the item data from data source(s) 64 specified in the configuration file 65A has already been pulled (i.e., read) and is stored as record(s) in the generated records database 65B. Typically, the item data is extracted by the auto suggest engine 63 from various data source(s) 64 at or after a predetermined time interval. In the example, that predetermined time interval is two hours, but the predetermined time interval may be adjustable to four, six, or eight hours, for example, via front end application 22.

In step S305, the auto suggest engine 63 applies excluding and ranking logic based on display priorities specified in the configuration file 65B. The auto suggest engine 63 reads each item record and checks if the item associated with the record is part of a suppress list. If the item is on a suppress list, then the item is excluded by flagging the record so that a dimension is not ultimately outputted for the record and/or by removing the record from generated records database 65A altogether.

The ranking logic is broken out into sub-steps S315-S345, and during these sub-steps a ranking is placed on each item record. In step S315, auto suggest engine 63 checks whether the item record is on a boost list. If the answer is yes, as shown in step S320, then the record created for the item is assigned a ranking of 00000000 plus the display priority (i.e. position or rating) in which the item has been boosted. For example, if the configuration file is set such that the iPhone 5C and iPhone 5S are boosted and the iPhone 5C is consequently selected over iPhone 5S, the respective ranking value will be 00000000 for the iPhone 5C and 00000001 for the iPhone 5S. This ensures the iPhone 5C always comes before iPhone 5S in display order. When two or more items possess the same ranking value, items with a more proximate release/available date to the current date are displayed earlier in the display order. Alternatively, when two or more items possess the same ranking value, the items may be displayed in a random order.

Although in our example the ranking range is an eight digit integer number that is padded with leading zeros, the ranking range can be arbitrary. In addition, the number of digits or leading zeros of the ranking range may be adjusted depending on the number of items is the data source(s) 64. To store the ranking value, a search query language (SQL) integer or other four byte integer storage type may be suitable. Alternatively, when a character string is used as the storage type for the ranking value, the string length may be adjusted to store an appropriate number of digits depending on the number of items in the data source(s) 64.

For example, the ranking range may be dynamically adjusted upwards when the number of items in the data source(s) 64 exceeds a predetermined threshold number of items or adjusted downwards when the number of items goes below a predetermined threshold number of items. Hence, when there are only 980 items in the data source(s) 64, the ranking range is adjusted to a three digit character string padded with leading zeros. Alternatively, when there are 8,500 items in the data source(s) 64, the ranking range is adjusted to a four digit character string padded with leading zeros. Such dynamic adjustments may advantageously optimize processing time by reducing the size of the numbers or character strings that are processed by the CPU of web server 50 and search server 61, reduce network load over the Internet 10 and Intranet 25, and reduce disk usage on a storage device of web server 50 and search server 61. In another example, the software designer may set the ranking range statically.

Moving now to step S325, when the item is not part of the boost list, then auto suggest engine 63 checks if the item is part of a bury list. If the answer is yes, as shown in step S330, then the record for the item is assigned a ranking of 99,999,999 minus the display priority (i.e., position or rating) in the bury list.

Continuing now to step S335, when the item is not part of either the suppress (i.e., exclude), boost, or bury lists, the auto suggest engine 63 looks for a release/available date for the item, and determines a ranking. An item with a more recent release date than items which have an older release date (when compared to the current date), obtains a higher ranking than the older items. An item with a sooner available date than items which have an available date further out in the future (when compared to the current date), obtains a higher ranking than the more futuristic items. In one example, as shown in step S340, the auto suggest engine 63 calculates the ranking as follows: (current time in milliseconds minus release/available date in milliseconds) divided by 60,000 and formatted to an 8 digit number with leading zeros. However, if there is no release/available date (step S345), the ranking of the record is set to 90,000,000 to place the item at the bottom of the rankings, thus placing the item on the same pedestal as to all items. Once any item has been boosted or buried, then the item is moved to a different priority. Again, as discussed previously, the ranking range may be adjusted upwards or downwards as the number of items in the data source(s) 64 increases or decreases based on predetermined thresholds.

Proceeding now to step S350, auto suggest engine 63 adds additional properties and synonyms to each of the item records, as outlined in FIGS. 1 and 2 above. For example, the additional properties include an image, display name, price, available date, release date, or rating with review count.

After executing the ranking calculation algorithm and placing the ranking and additional properties/synonyms on the item record, an XML dimension hierarchy file is generated by outputting an XML file based on each item record. The ranking is prefixed to the display name of each dimension node as an integer to determine the display order of each item and effectively presort the dimension nodes. The additional properties are also outputted to the XML dimension hierarchy file with the respective property values (e.g., a price property has a property value of $49.99). In step S355, an index is built for the XML dimension hierarchy file using the synonyms. Subsequently, when the user searches via front end application 22, a web page is generated that shows appropriate results based on the ranking logic and also the metadata mapping (e.g., image and display name mapping to the dimension). The results are based on using the inputted text string to query the generated index for appropriate dimension results from the generated XML dimension hierarchy file.

Figure 4:
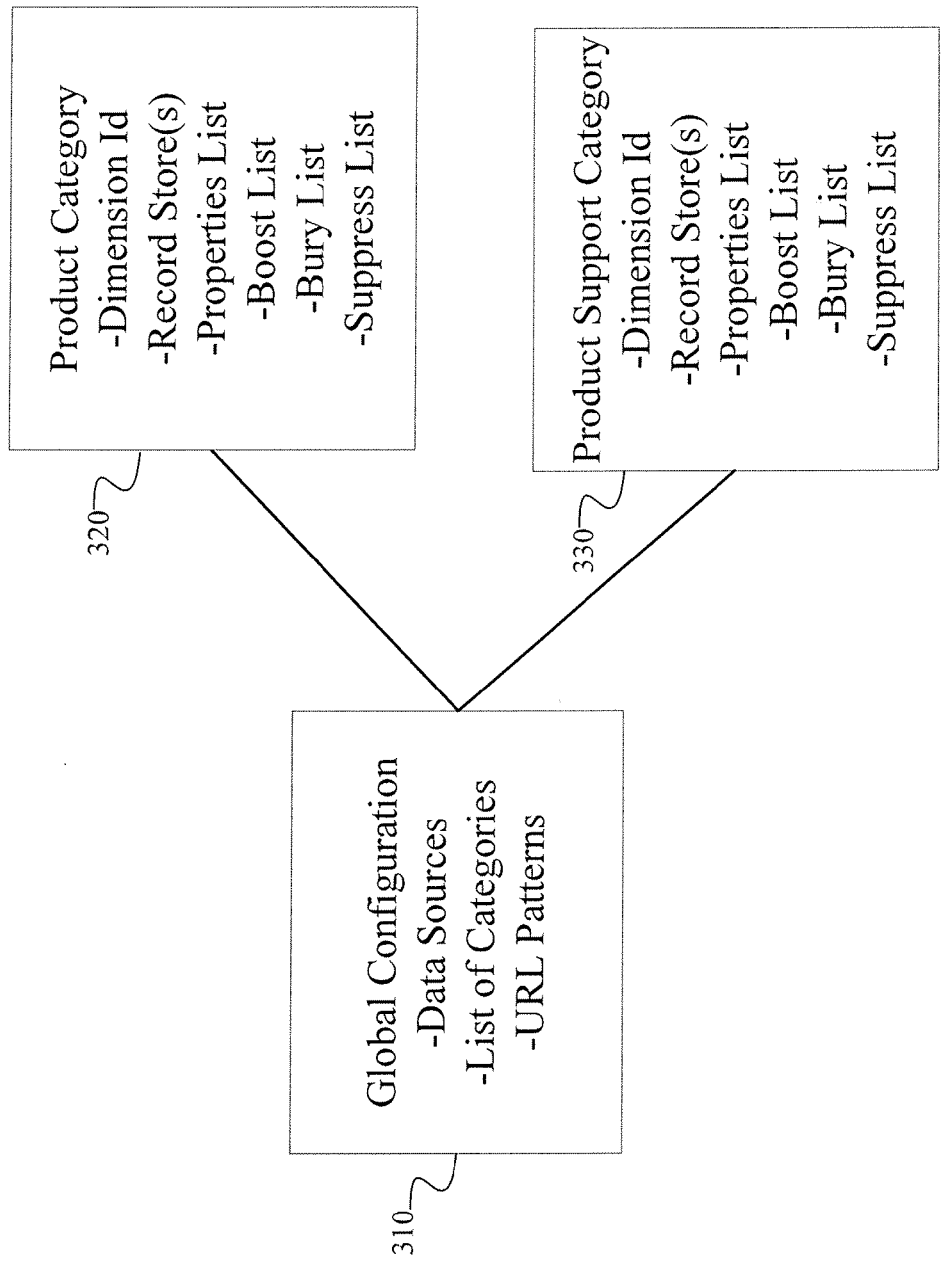
FIG. 4 is a configuration that is specified at multiple levels in a configuration file generated by the search server of FIG. 1.

FIG. 4 illustrates a configuration that is specified at multiple levels in a configuration file generated by search server 61. In the illustrated example, the configuration engine 62 generates the configuration file which has a tiered level structure: a global configuration and category level configurations. As shown, a global configuration 310 is a first level that is common across all categories of items, such as the product category 320, the product support document category 330, and the product accessories category (not shown). The global configuration 310 includes information regarding where the data sources reside, such as content acquisition system (CAS) information. Global configuration 310 also includes a listing of the different types of item categories, such as products, product accessories, and product support documents. In addition, the global configuration 310 includes uniform resource locator (URL) patterns that specify a format of the character string to create for the detail pages of each item category.

As further shown, the category configuration level for both the product configuration 320 and product support document configuration 330 includes the same specified parameters for each item: a dimension identifier, record store(s), properties list, boost list, bury list, and suppress list. The dimension identifier may be a group identifier that is used to group similar products or product support documents. For example, the iPhone 6 comes in 16 GB and 32 GB versions, and multiple colors. Accordingly, a group identifier is embedded within a dimension value (DVAL) XML tag to group the dimensions for each of the variations. In addition, each dimension is also identified by a unique identifier embedded within an XML synonym tag, for example. The record store(s) specifies where data sources for that item category are found. The properties list specifies the types of properties that are supported for the category and are predetermined; however, the actual values of those properties depend on the particular record(s) and are not predetermined. The boost, bury, and suppress lists specify the display priority and rankings for the items in the category, as outlined earlier.

FIG. 5A is an example of a portion of an XML dimension hierarchy file 500 generated by the search server 61. As shown, the XML dimension hierarchy file 500 includes a single dimension node that is identified by the DIMENSION_NODE XML tag. The dimension node includes a dimension value that is identified by a DVAL_ID XML tag which has an identifier (ID) property with a value of 1100000011. The dimension value is the group identifier to group multiple items together (or Endeca SKUs) that pertain to the "Galaxy S 5," such as products, product accessories, and product support documents.

Further shown in FIG. 5A is a synonym (SYN) XML tag with a character data (CDATA) section. The display name of the dimension node "Galaxy S 5" is prefixed with the ranking of 08958194. This ranking is generated using the ranking logic discussed in FIG. 3. Due to the presence of the "Galaxy S 5" synonym, when the user enters a text string "Galaxy S 5," the dimension node of FIG. 5A is retrieved. As further shown in the CDATA section of the synonym XML tag, a unique identifier for the dimension is appended after the display name "Galaxy S 5," and that unique identifier "dev2080010" distinguishes the particular item from the common display name of "Galaxy S5" for the products that are grouped together by the group identifier of 1100000011. Hence, products with the same display name can be distinguished by providing unique identifier values for the dimension in order to, for example, satisfy the constraints of Oracle Endeca.

Of note, the dimensions can be ordered in several ways, including alphabetically by dimension name or based on the number of records each dimension returns. In our example, however, the display name of the dimension node is prefixed with an integer ranking. This ranking is used to determine the ranking of the item in numerical ascending order, and the actual display name is also attached as a separate property.

FIG. 5B is an example of a portion of an XML dimension hierarchy file 530 generated by the search server 61. As shown, the XML dimension hierarchy file 530 includes three synonym (SYN) XML tags, which are leaf nodes under the same dimension node of FIG. 5A. The three synonyms are used to retrieve the same dimension node of FIG. 5A when the search terms of "Samsung," "GnG Devices," and "Smartphones" are entered in the text field for the auto suggest search in the front end application 22. Hence, both the brand and product category of the product are part of searchable indexed values.

FIG. 5C is an example of a portion of an XML dimension hierarchy file 560 generated by the search server 61. As shown, the XML dimension hierarchy file 560 includes a single synonym (SYN) XML tag which is a leaf node under a different dimension node than that of FIGS. 5A-B. The synonym XML tag includes a character data (CDATA) section with a value of "essential-travel-bundle-for-lucid3-purple." Although the dimension node of FIG. 5C is not shown, it should be understood that the dimension node is a travel bundle for a phone and is in the product accessory category.

As further shown, a variety of properties are included for the dimension node, including a display name of the SKU (a grouping of related items), image name of the SKU (URL where the image of the product accessory can be found), a product repository identifier which indicates where the item record is found, an image of the display name shown as "sku.seoDisplayName," type of product accessory/content (a product bundle), price, and available date shown as "DateAvailable." In this instance, the available date is encoded as a ranking for display order, as discussed in connection with the ranking logic of FIG. 3 above.

Figure 6:
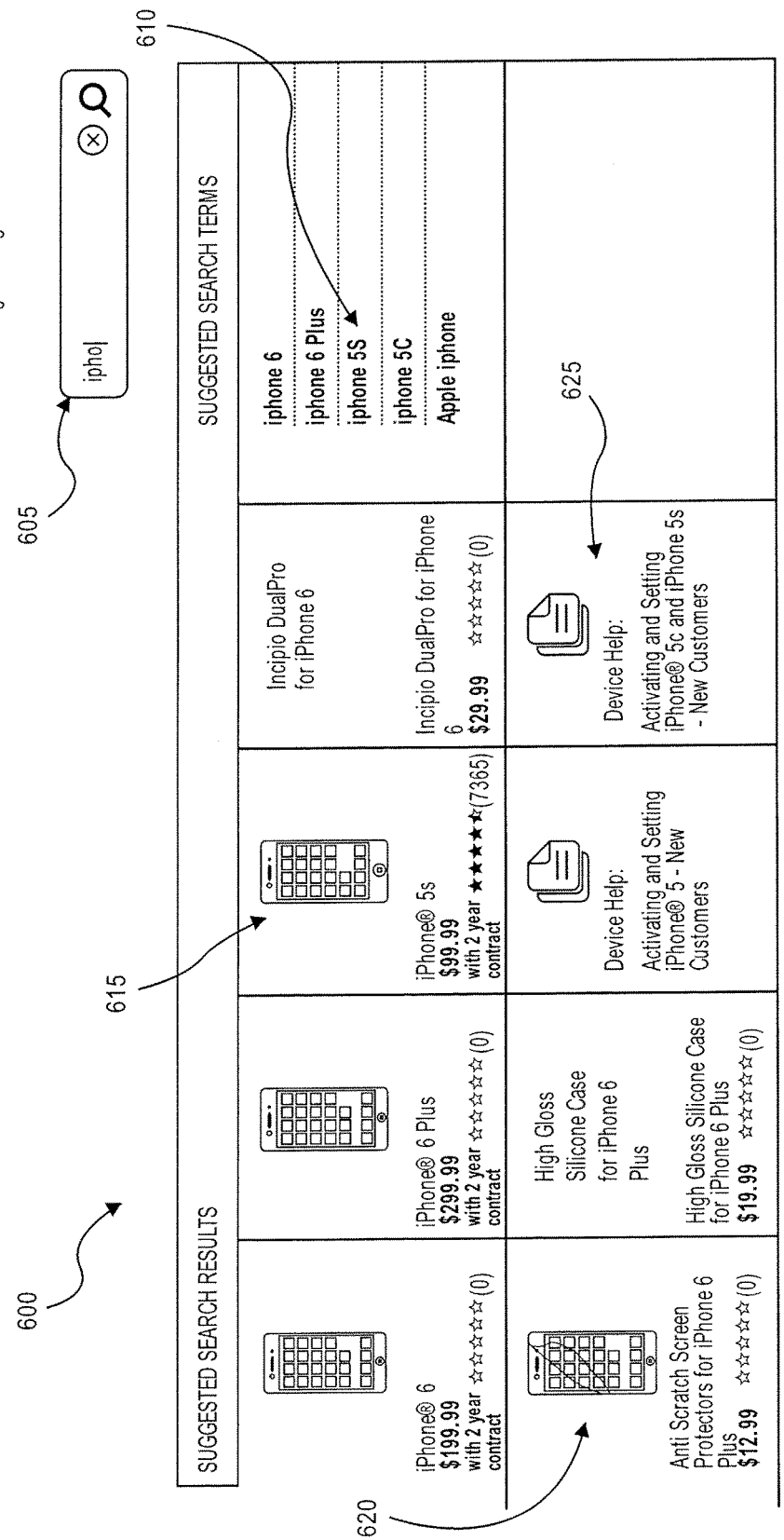
FIG. 6 is a graphical user interface of the front end application of FIG. 1 that is based on the XML dimension hierarchy file generated by the search server of FIG. 1 for a search, for example, for a smartphone.

FIG. 6 is a graphical user interface ("GUI") 600 of the front end application 22 that is based on the XML dimension hierarchy file generated by search server 61 of FIG. 1. In our example, the front end application 22 is a web browser that allows the user to input a text string in the text field 605 of an HTML form. Upon entry of the text string, the front end application 22 sends an HTTP request to the web server 50 which, in turn, triggers the auto suggest engine 63 of the search server 61. The user has entered "ipho" which generates suggested search results in addition to suggested search terms 610.

As shown, a variety of iPhones are retrieved as the suggested search results by the auto suggest engine 63 and then displayed in the suggested search results of front end application 22. The iPhone 6 has a more recent release date than the iPhone 5S. Thus, the iPhone 6 is given an earlier placement (first ranking) in the display order due to the higher ranking of the iPhone 6. As shown, the iPhone 5S product listing 615 includes the properties of the generated product category dimension for the iPhone 5S, including image, display name, price, and rating with review count. The anti-scratch screen protector accessory listing 620 includes the properties of the generated accessory category dimension for the anti-scratch screen, such as image, display name, price, and rating with review count. Finally, the iPhone 5C product support document listing 625 includes the properties of the generated product support category dimension for the iPhone 5C device help manual, such as image and display name.

Figure 7:
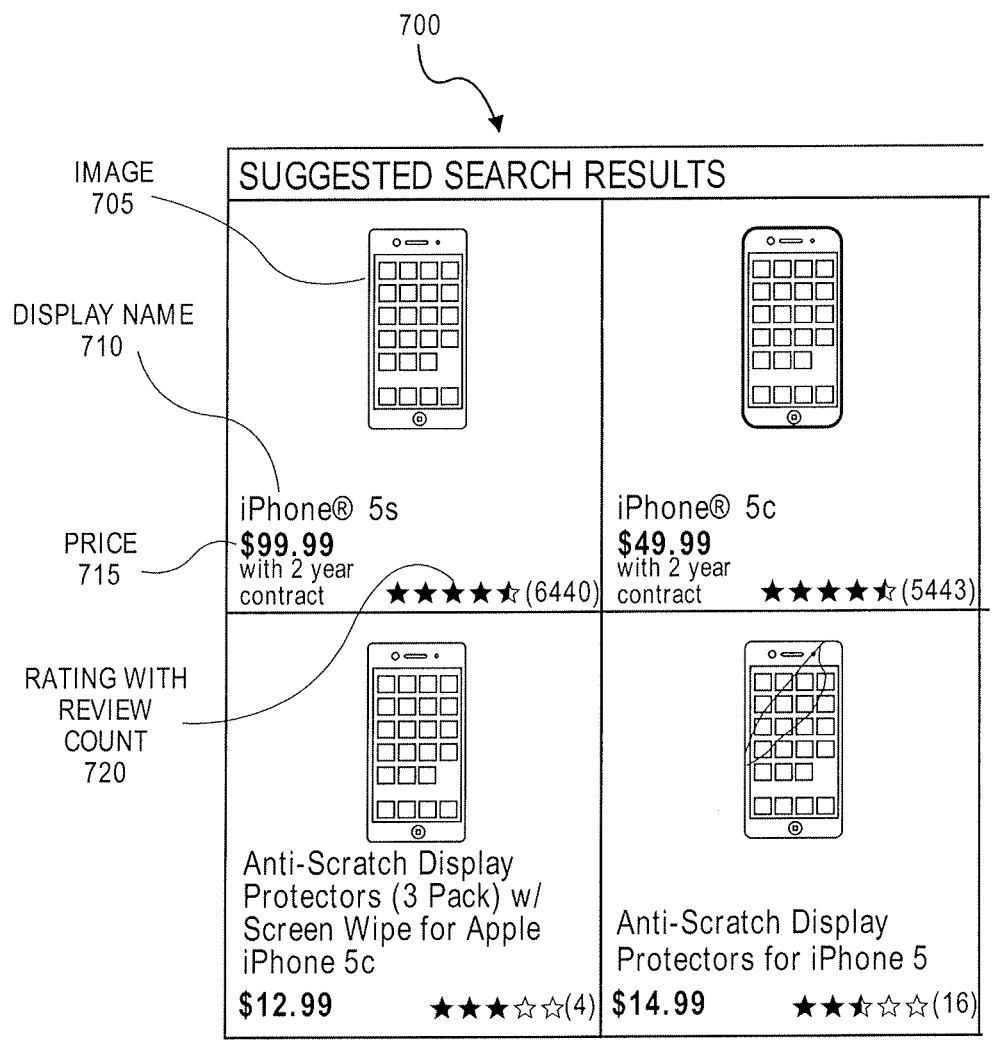
FIG. 7 shows suggested search results in a graphical user interface of the front end application of FIG. 1 that are based on the XML dimension hierarchy file generated by the search server of FIG. 1 for a search, for example, for a smartphone.

FIG. 7 shows suggested search results 700 in a GUI of the front end application 22 that are based on the generated XML dimension hierarchy file. The user has inputted a text string in the text field of an HTML form as discussed in FIG. 6 and, as a result, the suggested search results 700 are generated by the auto suggest engine 63. Here, the iPhone 5S product listing includes the properties of the generated product category dimension for the iPhone 5S. These properties include an image 705, display name 710, price 715, and rating with review count 720.

Figure 8:
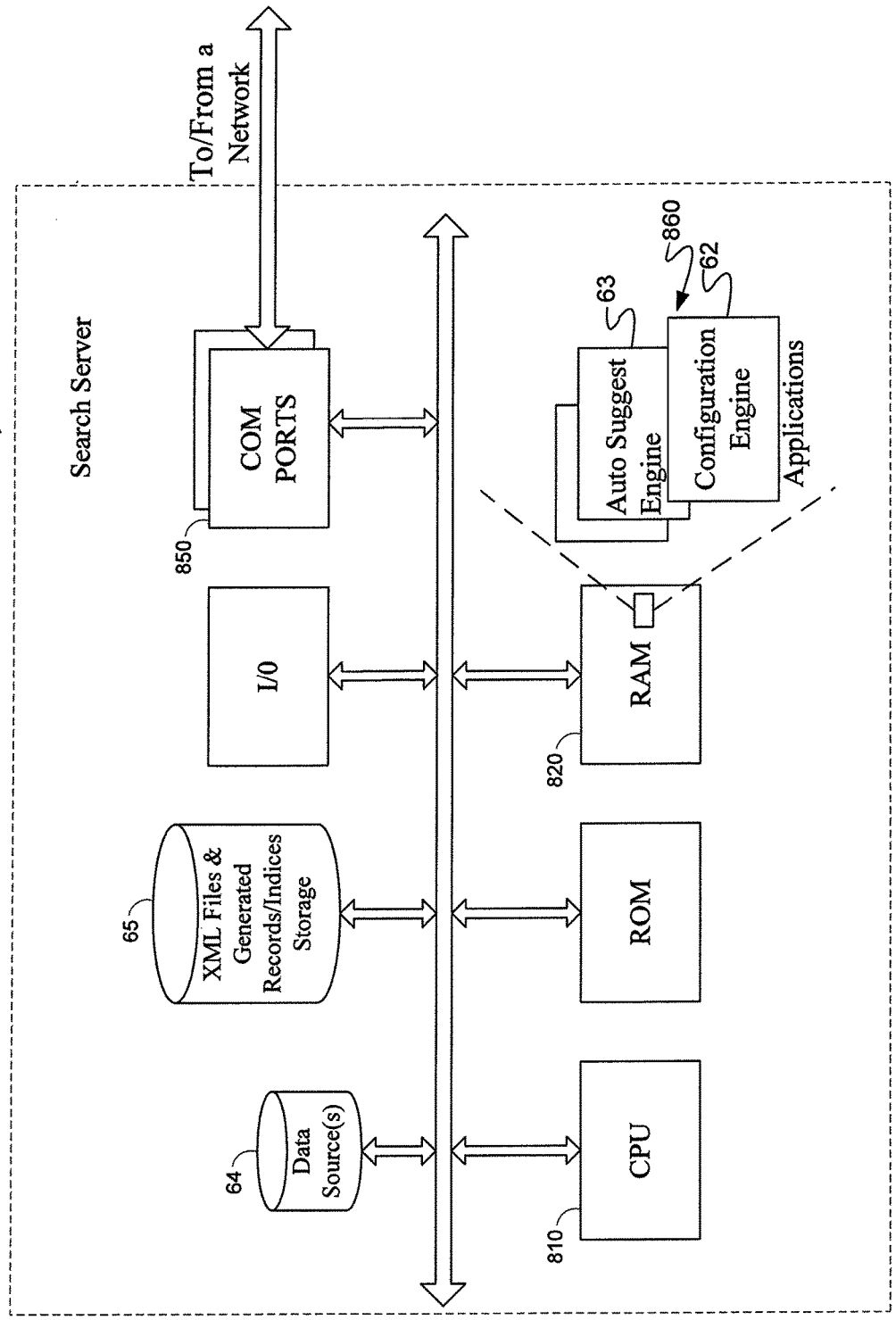
FIG. 8 is a high-level functional block diagram of a computer that may be configured as a server or host to function as any of the computer platforms in FIG. 1, for example, as the search server shown in the system of FIG. 1.

FIG. 8 is a simplified functional block diagram of a computer that may be configured as a server or host to function as any of the computer platforms in FIG. 1, for example, the search server 61 shown in the system of FIG. 1.

The search server 61 includes a CPU 810, in the form of one or more processors, for executing program instructions. Although the processor(s) forming the CPU 810 may be similar to the microprocessor used in the user devices 20A-N of FIG. 1, host or server computer platforms typically use somewhat different circuit architectures, e.g. to provide more processor power. Search server 61 also includes a memory 820, shown as RAM, that is accessible to the processor to execute various programming instructions. The memory 820 typically stores programming, such that execution of the programming by the processor 810 configures the search server 61 to perform the functions or procedures as described above. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

In this particular example, the search server 61 is shown as including the data source(s) 64 and XML files & generated records/indices 65 in separate storage devices, as discussed earlier. The data source(s) 64 and XML files & generated records/indices 65 are accessible to the central processing unit (CPU) 810 of the search server 61.

For packet data communication, search server 61 includes a data/network communication interface, shown generally as com ports 850. The com ports 850 may use any available data communication technology. In a fixed installation, for example, the corn ports 850 may include an Ethernet interface card for communication over appropriate data network wiring. For a wireless implementation, the coin ports 850 may include a WiFi transceiver. The com ports 850 allow the search server 61 to communicate with other devices and systems, such as front end application 22 of user devices 20A-N and web server 50.

In the illustration, search server 61 includes applications 860 stored in RAM 820, and more specifically, a configuration engine 62 and an auto suggest engine 63. The configuration engine 62 is tasked with initializing a configuration that has settings, such as via an XML configuration file. For example, the configuration specifies at least one data source, one or more dimensions to map each item of a plurality of items that include products, product accessories, or product support documents in the at least one data source, and a display priority for each item. The auto suggest engine 63 reads data from the at least one data source specified in the configuration file, and then generates a dimension hierarchy file for the read data using the configuration file, as discussed earlier.

In general, the term "engine" and "application," as used herein, refers to logic embodied in hardware or software instructions, which can be written in a programming language, such as Java™, C, C++, C Sharp, for example. A software engine or application can be compiled into executable programs or written in interpreted programming languages, such as Perl, Visual Basic script, HTML, or JavaScript. Software engines or applications may be callable from other engines or applications. Generally, the engines or applications described herein refer to logical modules that may be merged with other modules or divided into sub-module despite their physical organization. The engines or applications can be stored in any type of computer readable medium or computer storage device and be executed by one or more general purpose computers. In addition, the methods and processes disclosed herein can alternatively be embodied in specialized computer hardware or an application specific integrated circuit (ASIC).

Aspects of the methods of capturing retail store data, determining store-level and aggregated metrics, and displaying the determined metrics as outlined above may be embodied in programming, for example, for one or more server and/or for mobile devices. Program aspects of the technology may be thought of as "products" or "articles of manufacture" typically in the form of executable code and/or associated data that is carried on or embodied in a type of machine readable medium. Executable code, for example, may take the form of software, firmware, microcode or the like of a type suitable for execution by the particular processor hardware of the user devices 20A-N, web server 50, and search server 61 so as to configure the respective equipment to perform functions like those discussed herein.

"Storage" type media include any or all of the tangible memory of the computers, mobile devices, processors or the like, or associated modules thereof, such as various semiconductor memories, tape drives, disk drives and the like, which may provide non-transitory storage at any time for the programming. All or portions of the programming may at times be communicated through the Internet or various other telecommunication networks. Such communications, for example, may enable loading of the software or modules from one computer or processor into another, for example, from a management server or host computer of the enterprise offering the auto suggestion in search with additional properties into the computer platform of the web server 50 or search server 61; or downloading the front end application 22 into the user devices 20A-N. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s), mobile devices or the like, such as may be used to implement the secure payment processing techniques discussed herein. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer comprising:
   a network communication interface;
   a processor coupled to the network communication interface;
   a memory accessible to the processor; and
   programming in the memory, wherein execution of the programming by the processor configures the computer to perform functions, including functions to:
   initialize a configuration specified in an extensible markup language (XML) configuration file, the XML configuration file specifying at least one data source, a dimension to map each item of a plurality of items that include products, product accessories, or product support documents in the at least one data source, and a display priority for each item;
   read data from the at least one data source specified in the configuration file and generate a record for each item in the at least one data source;
   generate an XML dimension hierarchy file for the read data using the configuration file, the XML dimension hierarchy file including a dimension node for each item in the at least one data source, each dimension node having at least one property attached to each item and at least one synonym that is searchable to index each item;
   preprocess the XML dimension hierarchy file to index the at least one data source by indexing the record for each item in the at least one data source based on the at least one synonym of the item;
   receive a hypertext text transfer protocol (HTTP) request triggered by entry of a text string by a user to execute a search in a front end application of a user computing device;
   query the XML dimension hierarchy file using the index for suggested search items having at least one synonym that matches the text string or includes the text string as a subpart; and
   transmit a web page having at least one property of each suggested search item of the XML dimension hierarchy file to the user computing device.

2. The computer of claim 1, wherein execution of the programming by the processor configures the computer to perform further functions to:
   repeatedly preprocess the XML dimension hierarchy file to index the at least one data source at or after a predetermined time period.

3. The computer of claim 1, wherein execution of the programming by the processor configures the computer to perform further functions to:
   when generating the XML dimension hierarchy file:
   output a separate dimension node for each item to the XML dimension hierarchy file, each separate dimension node having a unique identifier to distinguish the item and a group identifier to group related items; and
   link the separate dimension node to a detail page for each item.

4. The computer of claim 3, wherein execution of the programming by the processor configures the computer to perform further functions to:
   embed the group identifier within a dimension value (DVAL) XML tag.

5. The computer of claim 4, wherein execution of the programming by the processor configures the computer to perform further functions to:
  embed the unique identifier within a synonym XML tag.

6. The computer of claim 3, wherein execution of the programming by the processor configures the computer to perform further functions to:
  index the separate dimension node based on the least one synonym;
  upon receiving the text string via the HTTP request from the front end application of the user computing device, retrieve one or more dimension nodes for display on the user computing device from the preprocessed XML dimension hierarchy file having the at least one synonym that includes the received text string; and
  control information displayed with each item in the web page based on the at least one property of each item.

7. The computer of claim 3, wherein execution of the programming by the processor configures the computer to perform further functions to:
  when generating the XML dimension hierarchy file:
    prefix a display name of each dimension node with a ranking that is an integer to determine display order of the items, wherein a low value integer receives a high ranking relative to a high value integer, and the high value integer receives a low ranking relative to the low value integer.

8. The computer of claim 7, wherein the ranking is prefixed as a character data (CDATA) XML section.

9. The computer of claim 1, wherein execution of the programming by the processor configures the computer to perform further functions to:
  output to the XML dimension hierarchy file as the at least one property for each item at least two of an image, display name, price, available date, or rating with review count.

10. The computer of claim 9, wherein execution of the programming by the processor configures the computer to perform further functions to:
  embed at least one of the image, the price, or the available date as a character data (CDATA) section within a property value (PVAL) XML tag.

11. The computer of claim 1, wherein execution of the programming by the processor configures the computer to:
  when initializing the configuration specified in the XML configuration file:
    adjust the display priority for each item based on a boost, bury, or suppress rating, the boost rating indicating to adjust the display priority of the item upwards, the bury rating indicating to adjust the display priority of the item downwards, and the suppress rating indicating to not display the item.

12. The computer of claim 11, wherein execution of the programming by the processor configures the computer to:
  when generating the XML dimension hierarchy file, output to the XML dimension hierarchy file a ranking that is calculated based on the adjusted display priority of the item from the configuration file as the at least one synonym to index each item.

13. The computer of claim 11, wherein execution of the programming by the processor configures the computer to:
  when generating the XML dimension hierarchy file:
    upon determining first and second items have no boost, bury, or suppress rating, adjust a ranking of the first item upwards relative to a ranking of the second item when the first item has a more recent release date than the second item.

14. The computer of claim 13, wherein execution of the programming by the processor configures the computer to:
  when generating the XML dimension hierarchy file:
    upon determining first and second items have no boost, bury, or suppress rating and no release date, adjust the display priority of the first item upwards relative to the second item when the first item has an available date that is more proximate to the current date than the second item.

15. The computer of claim 14, wherein execution of the programming by the processor configures the computer to:
  when generating the XML dimension hierarchy file:
    upon determining the first and second items have no boost, bury, or suppress rating and no release or available dates, set the ranking of the first and second items to an integer value that places the first and second items at the bottom of display order.

16. The computer of claim 1, wherein execution of the programming by the processor configures the computer to:
  when generating each dimension node for each item, output to the XML dimension hierarchy file a first synonym corresponding to a brand of the item and a second synonym corresponding to a product category of the item.

17. The computer of claim 1, wherein execution of the function of initializing the configuration, includes functions to:
  specify in the XML configuration file a first configuration that is common across all of the plurality of products, product accessories, and product support documents;
  specify in the XML configuration file a second configuration that is specific to the products;
  specifying in the XML configuration file a third configuration that is specific to the product accessories; and
  specify in the XML configuration file a fourth configuration that is specific to the product support documents.

18. The computer of claim 17, wherein execution of the function of reading data from the at least one data source specified in the configuration file, includes functions to:
  crawl at least one of a file system, content management system, web server, database, or customized data source for documents, files, or raw data;
  convert the documents, files, or raw data into at least one record based on the configuration file; and
  store the at least one record as the read data.

19. The computer of claim 18, wherein execution of the function of generating the XML dimension hierarchy file for the read data, includes functions to:
  generate a first XML dimension category file for the products;
  generate a second XML dimension category file for the product accessories; and
  generate a third XML dimension category file for the product support documents.

20. The computer of claim 19, wherein execution of the function of generating the XML dimension hierarchy file for the read data, further includes a function to:
  combine the first, second, and third XML dimension category files to generate the XML dimension hierarchy file by consolidating the first, second, and third XML dimension category files together.

* * * * *

UNITED STATES PATENT AND TRADEMARK OFFICE
CERTIFICATE OF CORRECTION

PATENT NO. : 9,635,089 B2
APPLICATION NO. : 14/587155
DATED : April 25, 2017
INVENTOR(S) : Rangappa et al.

Page 1 of 1

It is certified that error appears in the above-identified patent and that said Letters Patent is hereby corrected as shown below:

On the Title Page

Item (72) Inventor is corrected to read:
-- Annappa D. Rangappa, Piscataway (NJ);
Sukumar Thiagarajah, Laurence Harbor (NJ);
Vijayachandran Jayachandran, Dallas (TX);
Pankaj C. Rajankar, Cumming (GA);
Krishnendu Karmohan, Scotch Plains (NJ);
Richard Ching, Johns Creek (GA);
Shashidhar Hiremath, Skillman (NJ) --.

Signed and Sealed this
Eighteenth Day of February, 2020

Andrei Iancu
*Director of the United States Patent and Trademark Office*